(12) United States Patent
Kaiser et al.

(10) Patent No.: US 8,255,675 B1
(45) Date of Patent: Aug. 28, 2012

(54) SYSTEM AND METHOD FOR STORAGE MANAGEMENT OF FILE SYSTEM CONFIGURATION DATA

(75) Inventors: Scott D. Kaiser, Belmont, CA (US); Ronald S. Karr, Palo Alto, CA (US); John A. Colgrove, Los Altos, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1748 days.

(21) Appl. No.: 11/503,238

(22) Filed: Aug. 11, 2006

Related U.S. Application Data

(60) Provisional application No. 60/818,186, filed on Jun. 30, 2006.

(51) Int. Cl.
*G06F 15/177* (2006.01)

(52) U.S. Cl. ............ 713/1; 707/822; 707/827; 709/220

(58) Field of Classification Search ...... 713/1; 707/822, 707/827; 709/220
See application file for complete search history.

(56) References Cited

U.S. PATENT DOCUMENTS

| | | | |
|---|---|---|---|
| 5,828,876 A | 10/1998 | Fish et al. | |
| 6,931,450 B2 | 8/2005 | Howard et al. | |
| 6,938,084 B2 | 8/2005 | Gamache et al. | |
| 7,010,528 B2 | 3/2006 | Curran et al. | |
| 7,010,554 B2 | 3/2006 | Jiang et al. | |
| 7,313,662 B2 * | 12/2007 | Nishikawa et al. | 711/162 |
| 7,389,401 B2 * | 6/2008 | Li et al. | 711/203 |
| 7,546,412 B2 * | 6/2009 | Ahmad et al. | 711/112 |
| 2003/0177107 A1 | 9/2003 | Brown et al. | |
| 2005/0024665 A1 * | 2/2005 | Melin et al. | 358/1.13 |
| 2005/0262103 A1 | 11/2005 | Stakutis et al. | |
| 2006/0047716 A1 | 3/2006 | Keith, Jr. | |
| 2006/0095479 A1 | 5/2006 | Goldbert et al. | |
| 2006/0106827 A1 | 5/2006 | Brown et al. | |
| 2006/0123061 A1 | 6/2006 | Puustinen | |
| 2006/0129513 A1 | 6/2006 | Nakatani et al. | |
| 2006/0161518 A1 | 7/2006 | Lacapra | |
| 2006/0200473 A1 * | 9/2006 | Whitehead et al. | 707/10 |
| 2009/0144290 A1 * | 6/2009 | Nakatani et al. | 707/10 |

* cited by examiner

*Primary Examiner* — Albert Wang

(74) *Attorney, Agent, or Firm* — Robert C. Kowert; Meyertons, Hood, Kivlin, Kowert & Goetzel, P.C.

(57) ABSTRACT

Configuration data, such as options a file system accessed by a host system, may be stored on the storage device storing the file system. File system configuration data may be stored in a file of the file system or in a private storage area configured for storing file system configuration data. A host may access the file system configuration data and subsequently may access the file system according to the file system configuration data. Additionally, different versions of file system configuration data may be stored and different hosts accessing the file system may read and use different versions of the file system configuration data based upon the type or context of the host accessing the file system. Storing file system configuration data with the file system data, or on the same storage device, may allow context dependent options to be provided to various hosts accessing the file system data.

20 Claims, 8 Drawing Sheets

FIG. 1B                                   FIG. 1C

| role | setting | value | ... |
|---|---|---|---|
| primary host | mount point | /appdata | ... |
|  | mount options |  | ... |
|  | read-ahead | non-seq. read-ahead | ... |
|  | QoSS scan freq. | daily QoSS scans | ... |
|  | checkpoint freq. | hourly checkpoints | ... |
|  | file change log | ON | ... |
| failover host | mount point | /appdata | ... |
|  | mount options |  | ... |
|  | read-ahead | non-seq. read-ahead | ... |
|  | QoSS scan freq. | No QoSS scans | ... |
|  | checkpoint freq. | daily checkpoints | ... |
|  | file change log | ON | ... |
| backup host | mount point | /servername/appdata | ... |
|  | mount options | ioerror=nodisable, tmplog | ... |
|  | read-ahead | sequential read-ahead | ... |
|  | QoSS scan freq. | No QoSS scans | ... |
|  | checkpoint freq. | No checkpoints | ... |
|  | file change log | OFF | ... |
| replicated host | mount point | /appdata | ... |
|  | mount options |  | ... |
|  | read-ahead | non-seq. read-ahead | ... |
|  | QoSS scan freq. | No QoSS scans | ... |
|  | checkpoint freq. | hourly checkpoints | ... |
| ... | ... | ... | ... |

*FIG. 3B*

SYSTEM AND METHOD FOR STORAGE MANAGEMENT OF FILE SYSTEM CONFIGURATION DATA

BACKGROUND OF THE INVENTION

1. Field of the Invention

This invention relates to data management in general and, more particularly, to a method and system for storing file system and/or volume configuration data.

2. Description of the Related Art

Traditionally, file system configuration data has been stored locally on the particular host system that will be accessing the file system. For example, a host generally will include information for properly accessing the file system in a file on the host device itself. For example, file system configuration is frequently stored on a boot disk (or other local storage area) of a host system. When needing to access, such as to mount, a file system, the host first reads its local configuration information in order to determine various values, such as the correct mount point and device location, for accessing the file system.

When file system data is accessed by more than one host system, such as in a clustered environment, file system configuration has traditionally been manually configured locally on each host needed access to the file system. Alternatively, file system configuration information has been communicated between different host systems via a network. Thus one host system that locally stores file system configuration information may sent that information, such as using messages over a network, to another host that needs to access the file system. Additionally, different symbolic links stored on a boot disk (or other host-local storage area) have been used for different host systems, allowing the individual host systems to access the file system in different manners or according to different configuration parameters.

SUMMARY

File system configuration data, such as options for accessing file system data, may be stored on a storage device also storing the file system data rather than locally on a host accessing the file system data. For example, in one embodiment, file system configuration data may be stored in a file of the file system itself. In some embodiments, file system configuration data may be stored in hidden file, while in other embodiments the configuration data may be stored in a normal, or visible file of the file system. Alternatively, file system configuration data may be stored in a private storage area configured for storing file system configuration data. In some embodiments, file system configuration data may be stored with the file system data, but not in, or as part of, a file. Thus, in some embodiments, a host desiring to mount and access a file system may first read the file system configuration data from the remote storage device. In some embodiments, a host may read a file including the configuration data, while in other embodiment, the host may access a fixed and/or reserved location on a storage device that is not part of a file, but includes the configuration data. The host may subsequently access the file system, such as to mount and read the data of the file system, according to the information from the file system configuration data.

In some embodiments, storing configuration data on a remote storage device that also stores the file system data may allow the file system to be mounted by different host systems without requiring the manual entry of the configuration data on each host system. Instead, a host system may be configured to load the configuration data from the file system storage device rather than locally from storage on the host system. In some embodiments, however, some basic configuration information may be stored on the host system, such as on a boot disk, in order to allow the host system to access the file system configuration data from the remote storage device.

Additionally, different versions of file system and/or volume configuration data may be maintained and different hosts accessing the file system or volume may read and use different versions of the configuration data based upon the type or context of the host system. For instance, one host may mount and access a file system using one set of parameter values from the configuration data while another host may mount and access the file system using a different set of parameter values from the configuration data. Multiple hosts may be configured to each access a different version of file system and/or volume configuration data based on a current context for the host, such the type of host system or a role that the host system is performing. Thus, different versions of file system and/or volume configuration may not represent sequential or related versions, but instead may simply represent different sets of configuration data for different hosts.

BRIEF DESCRIPTION OF THE DRAWINGS

FIG. 1B is a block diagram illustrating file system configuration data stored within a file system, in one embodiment.

FIG. 1C is a block diagram illustrating file system configuration data stored in a private configuration volume, according to one embodiment.

FIG. 3B is block diagram illustrating an alternate format for file system configuration data, according to one embodiment.

DETAILED DESCRIPTION OF EMBODIMENTS

Configuration data, such as for a file system, may be stored on storage device separate from a host system accessing the file system. Please note that the term 'file system' is used herein to refer to the data of a file system, such as computer files or database data, as well as the metadata, such as information defining a directory structure, for the file system. Additionally, in some embodiments, a file system may be distributed across multiple storage devices. For example, in one embodiment, configuration data for a file system, such as mount point identification, other mount options, migration policy information, checkpoint options, backup options, quality of storage service options, storage tiering, policies, etc, may be stored on a storage device that also stores the file system and file system data to which the configuration data applies. In some embodiments, the configuration data may be stored in a file of the file system itself. In one embodiment, the configuration data may be stored in an invisible or otherwise hidden file, while in another embodiment the configuration data may be stored in a normal, or visible, file. In yet other embodiments, the configuration data may be stored in a private storage area of the storage device, such as one only accessible via special volume-level API functions or another custom inter-process communication mechanism.

Figure 1A:
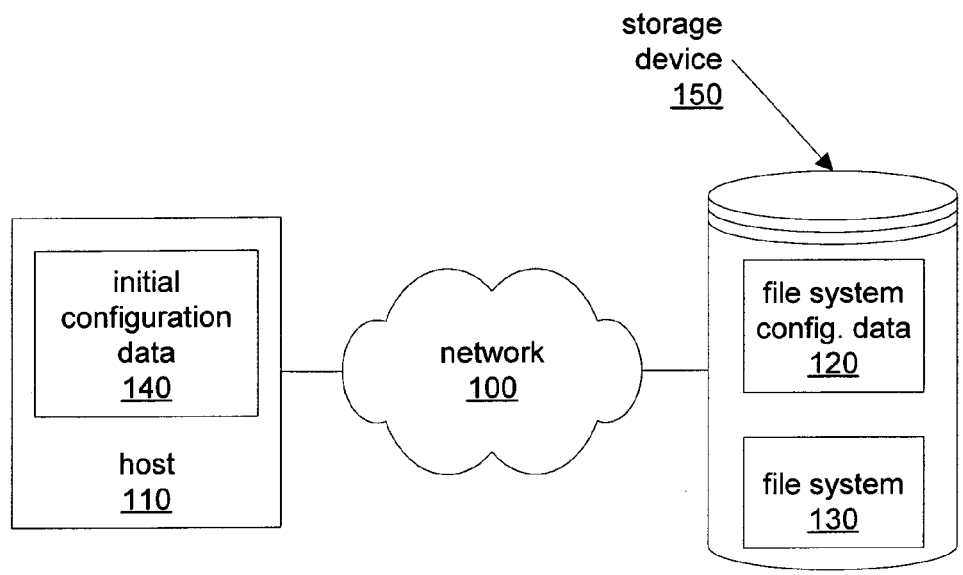
FIG. 1A is a block diagram illustrating one embodiment of storing configuration data on the same storage device as the file system for which the configuration data applies.
Figure 1A:
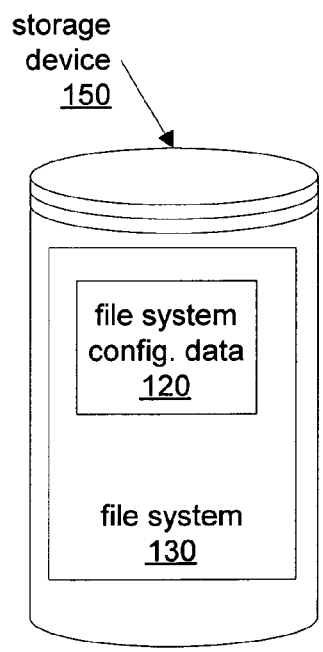
Figure 1A:
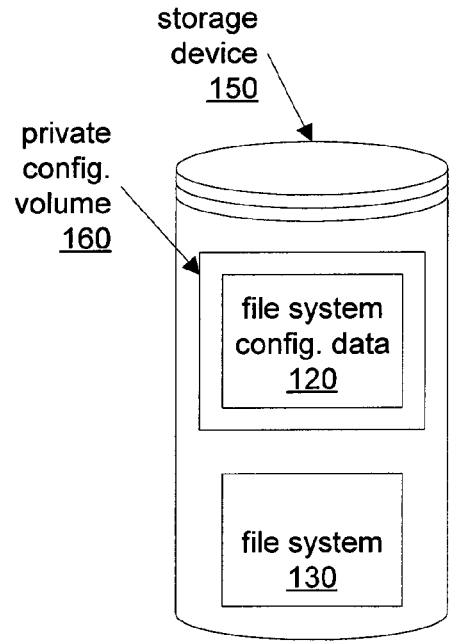

FIG. 1 is a block diagram illustrating one embodiment of storing configuration data on the same storage device as the file system for which the configuration data applies. For instance, host 110 may be a host system that needs to access the file system 130 on storage device 150. In some embodiments, host 110 may include initial configuration data 140 that, in some embodiments, may include information enabling host 110 to locate and access file system configuration data 120 on storage device 150. For instance, host configuration data 140 may include information identifying storage device 150 and may also include information indicating the location and/or how, such as via which API function, to access file system configuration data 120.

In some embodiments, storage device 150 may be part of a distributed or clustered storage environment and file system configuration data 120 may include information enabling host 110 to access the data stored on storage device 150 as part of the clustered environment. For example, in such an embodiment, host 110 may represent an application server or fail-over server of the clustered environment. Thus, host 110 may be configured to access file system configuration data 120 from storage device 150 in order to use the information, options and parameters in file system configuration data 120 to access a file system or other data of the clustered environment.

For example, in some embodiments file system 130 may be distributed across multiple storage devices of a distributed or clustered environment and file system configuration data 120 may be stored one or more of the storage device. For example, in one embodiment, storage device 150 may be one of multiple storage devices in a distributed environment and may also store file system configuration data 120. Thus, in such an embodiment, host system 110 may be configured to first read file system configuration data 120 from storage device 150 and then use the information from file system configuration data 120 to access file system 130, even though accessing file system 130 may include using file system configuration data 120 to access data from file system 130 stored on a different storage device (than storage device 150).

In some embodiments, file system configuration data 120 may, as illustrated in FIG. 1B, be stored as part of file system 130, such as in a file of the file system, and host configuration data 140 may include information indicating the file and thus enabling host 110 to locate file system configuration data 120. For example, file system configuration data 120 may be stored in a hidden or invisible file of file system 130, in one embodiment. In other embodiments, file system configuration data 120 may be stored as part of file system 130, but not within a file of file system 130. Instead, file system configuration data 120 may be stored at a fixed and/or reserved location within file system 130, but not part of any particular file. When file system configuration data is stored in a file of the file system, host 110 may not be able to read the file directly since host 110 may need the information from the file system configuration data in order to mount, and thus access the files of the file system. Consequently, in some embodiments, host 110 may be configured to request file system configuration data 120 from storage device 150 and may include the name (and/or full path) of the file in which file system configuration data 120 is stored when requesting the configuration data. In some embodiments, host 110 may request file system configuration data 120 directly from storage device 150 while in other embodiments host 110 may request the configuration data from another device, process, or system, such as from a volume manager or other management application configured to read file system configuration data 120 from storage device 150 on behalf of host 110.

In other embodiments, file system configuration data 120 may be stored in a separate storage area on storage device 150 that may not be a part of file system 130. For instance, in one embodiment, file system configuration data 120 may be stored in a private, volume level (rather than file system level) storage area on storage device 150. In one embodiment, file system configuration data 120 may be stored on private configuration volume 160, as illustrated by FIG. 1C. For example, private configuration volume 160 may be a volume specifically configured for storing various types of configuration information including, in some embodiments, file system configuration data 120. In some embodiments, the data stored in private configuration volume 160 may only be accessible via special API functions or via a special messaging interface, such as may be implemented by storage device 150 or by another system, such as a volume manager, capable of accessing private configuration volume 160.

In some embodiments, a management interface may be provided, such as by storage device 150, host 110, or by another system, such as a volume manager, configured to manage storage device 150. Such a management interface may allow an administrator to setup and configure file system configuration data 120 stored on storage device 150. For example, in one embodiment, storage device 150 may provide a web-based management interface allowing an administrator to manage file system configuration data 120 from across network 100, such as via a browser program from host 110.

In some embodiments, file system configuration data, such as file system configuration data 120 may be stored on one storage device, such as storage device 150, but may be used to access a file system that is stored across multiple storage devices. In some embodiments, a copy of the file system configuration data may be stored on each storage device in such a distributed system, while in other embodiments the file system configuration data may only be stored on a single storage device. Additionally, in some embodiments, a host system, such as host 110 may also store a local copy of the file system configuration data, such as by creating a cached version of the configuration data after accessing the file system configuration data 120 from storage device 150. In some embodiments, host 110 may be configured to update its cached version of file system configuration data 120 every time it accesses or reads the configuration data from storage device 150.

In some embodiments, storing file system configuration data on the same storage device on which the file system is located may allow certain operations to be performed on the configuration data when they are also performed on the file system data. For example, in one embodiment, the file system configuration data may be backed up, replicated, or moved to another storage device along with the file system itself. This may be especially true in embodiments where the file system configuration data is stored within the file system itself, such as illustrated by FIG. 1B, described above.

Additionally, in some embodiments, storing file system configuration data with a file system itself may allow the file system configuration data to move with the file system if that file system is moved to another storage device or storage system. For example, in one embodiment, a snapshot of a file system including the data and metadata for the file system may be made available on a different storage device. By storing the file system configuration data with the file system, such as in a file of the file system, the file system configuration data may be moved with the file system without having to specifically move the file system configuration data separately and without having to re-enter the file system configuration data after the move. In some embodiments, storing file system configuration with the corresponding file system may prevent unnecessary time and cost that may otherwise be expended to re-enter the configuration data if the file system is moved to another storage device or system. Thus, by storing file system configuration data with the corresponding file system, certain operations may be performed on the configuration data for free when those operations are performed on the file system, according to some embodiments.

While mainly described herein regarding file system configuration data, in some embodiments, configuration information for other types of systems or applications may also be stored on storage devices remote from a hosts that access those storage devices. For example, the data for a volume or a volume manager may also be stored with the data for that volume, according to one embodiment. In general the techniques described herein may be applied to any remote storage backed system accessible from host systems.

In some embodiments, storing configuration data on a storage device that also stores data for which the configuration data applies may allow multiple host system to access the data on the storage device without each host maintaining its own configuration data. Thus, rather than an administrator manually updating configuration data on each host, a host may be configured to load the configuration data from a remote storage device and use the information from the configuration data to access data, such as by mounting a file system, on the same or another storage device. In some embodiments however, a host may maintain a temporary or cached copy of the configuration data after loading it from a remote storage device, such as to allow unmounting and remounting without reloading the configuration data from the remote storage device.

Figure 2:
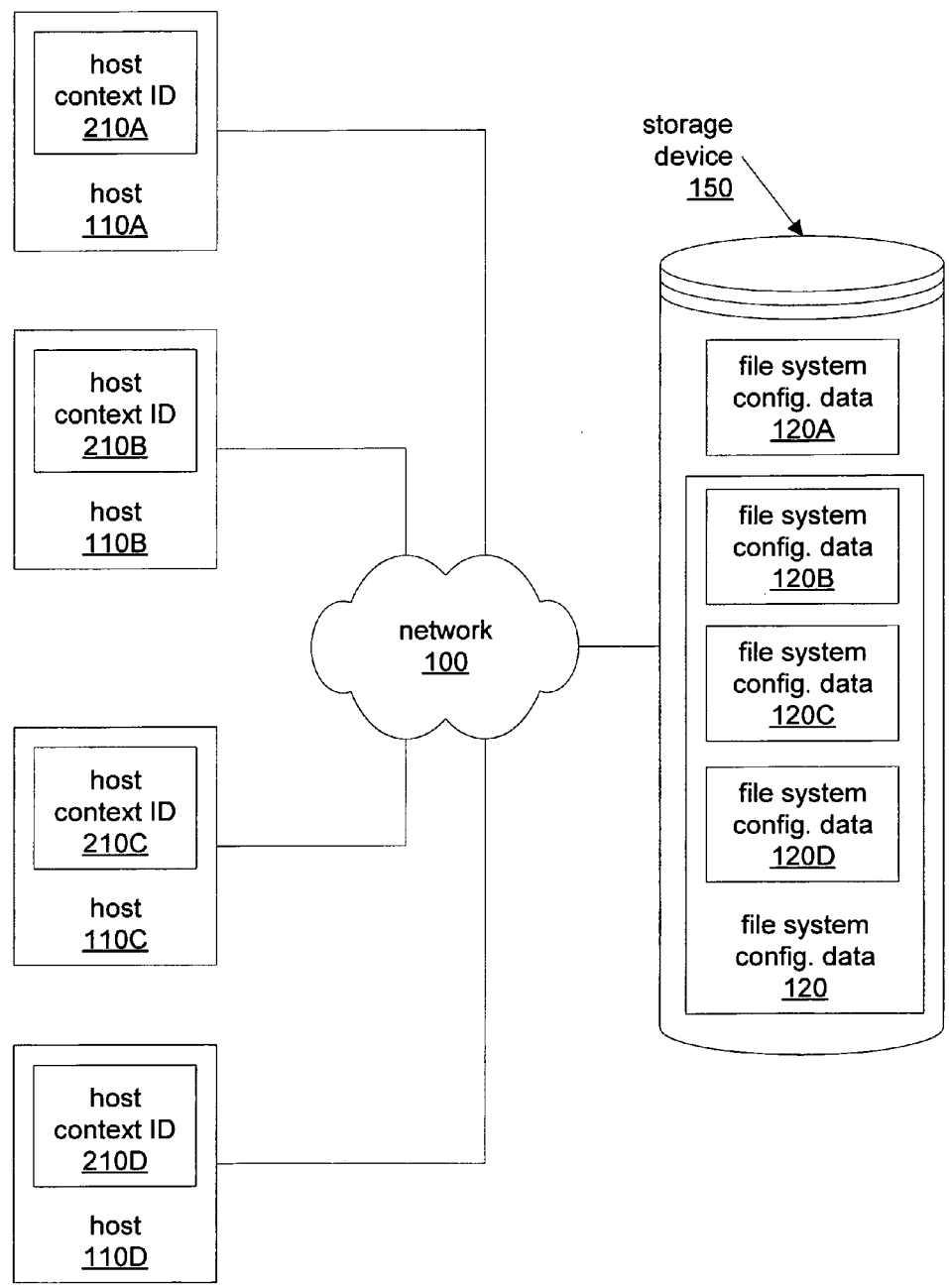
FIG. 2 is a block diagram illustrating one embodiment of a system including multiple hosts and at least one storage device including configuration data.

FIG. 2 is a block diagram illustrating one embodiment of a system including multiple hosts and at least one storage device including configuration data. In some embodiments, such as illustrated by FIG. 2, different versions of configuration data, such as file system configuration data 120A, 120B, 120C and 120D may be stored and used by different host systems, such as host 110A, 110B, 110C and 110D to access the data on storage device 150. In one embodiment, the different versions of configuration data, such as file system configuration data 120B, 120C and 120D, may be stored as part of a single file system configuration file, such as within file system configuration data 120. In other embodiments, however, individual or different versions of file system configuration data, such as file system configuration data 120A may be stored separately from other versions, if any, that are stored on the same storage device. In some embodiments, multiple versions of file system configuration data may be stored together, such as file system configuration data 120B, 120C and 120D stored in file system configuration data 120, while other versions, such as file system configuration data 120A may be stored separately. In some embodiments, one version of file system configuration data may be stored in one manner, such as in a hidden file or using a particular data format, while another version stored on the same storage device may be stored in a different manner, such as in a visible file or using a different data format.

In some embodiments, different hosts, such as hosts 110A, 110B, 110C and 110D, may need to access data on storage device 150 in different manners or may perform different functions or operations on the data of storage device 150, and thus may need different versions of file system configuration data. For example, in a clustered environment, one host, such as host 110A, may be an application host (or server) that may need access to the data on storage device 150 in order to service incoming requests from clients. Another host, such as host 110B, may be a back-up server that is responsible for implement various back-up, restore, replication, checkpoints, snapshots, and/or other operations on the data of storage device 150. Thus, host 110A and host 110B may require different versions of file system configuration data. For instance, a backup server may need to have various options related to backup, replication, fail-over, recovery, or other services that an application host may not need. Similarly, an application server may need configuration options unneeded by a backup server, such as data caching options.

Thus, in some embodiments, storage device 150 may include context dependent configuration data 220 that includes different versions of configuration data. When host 110A desires to access data on storage device 150, host 110A may first access file system configuration data 120A from context dependent configuration data 220, according to one embodiment. As noted above, in some embodiments, a host system, such as host 110A may include host configuration data 140 including information enabling the host system to locate and access configuration data stored on the storage device. For example, in one embodiment, host 110A may include host context ID 210A in host configuration data 140 and may use host context ID 210A to access file system configuration data 120A, rather than file system configuration data 120B or 120C. In some embodiments, a special API may be utilized by host 110A to access context dependent configuration data. For instance, host 110A may send a request message to storage device 150 requesting configuration data and may include a host ID, such as from host context ID 210A to enable storage device 150 to locate the proper version of configuration data for host 110A.

Figure 3A:
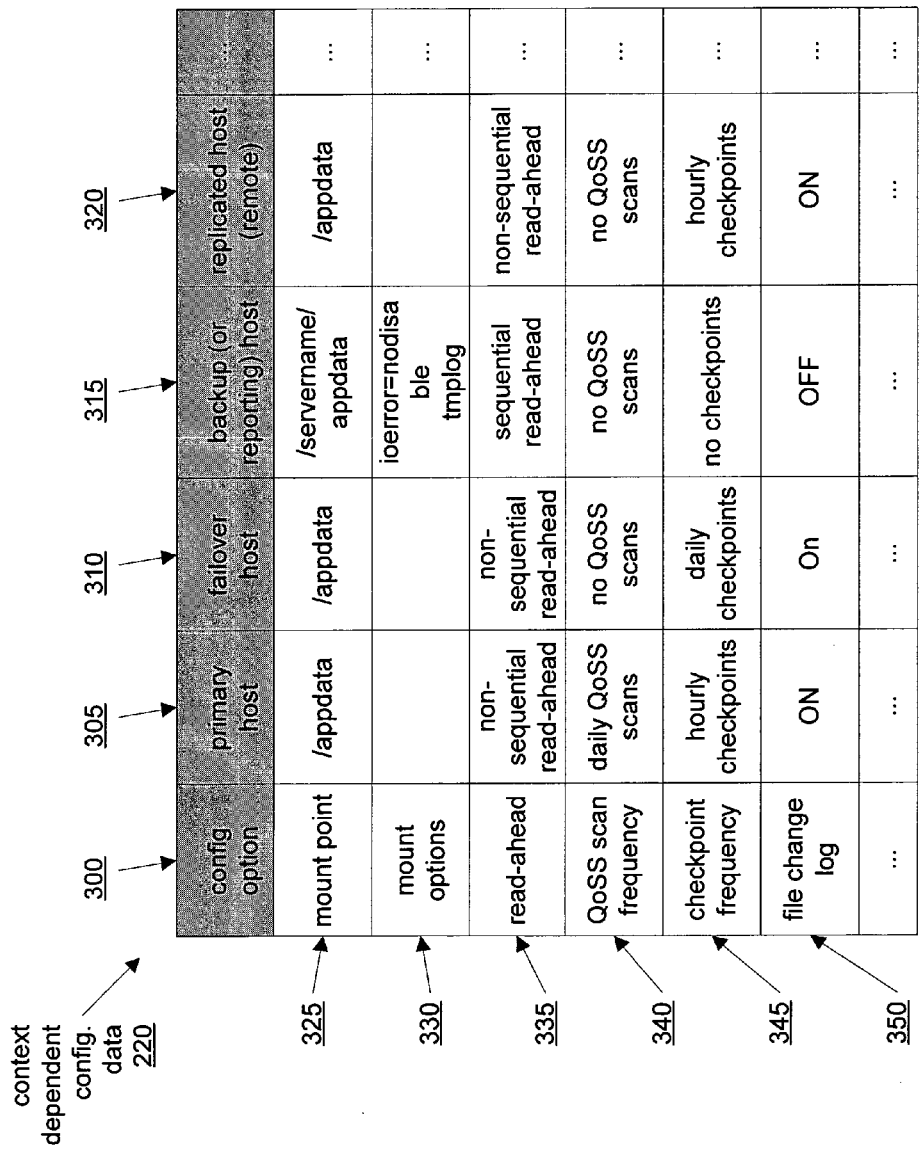
FIG. 3A is block diagram illustrating an exemplary set of file system configuration data, according to one embodiment.

FIG. 3A illustrates one embodiment of an exemplary set of file system configuration data 120 including context dependent configuration data. For example, the configuration data illustrated in FIG. 3A may be stored in a database format, such as the rows and columns illustrated in FIG. 3A. Please note that FIG. 3A illustrates only one possible configuration or format for storing configuration data, such as context dependent configuration data 220. Configuration data 220 may be stored using other formats or data structures in other embodiments. For example, configuration data 220 may be stored in various types of formats, such as flat file, object-oriented, relational, LDAP, etc. according to various embodiments.

FIG. 3A illustrates exemplary values of five different configuration options for four different hosts. Please note however, that in other embodiments many more options and a different number of hosts may be included in stored file system configuration data. Column 300 may represent the various configuration options for which values are stored in file system configuration data 120, and columns 305, 310, 315, and 320 may include the various option values for each of four host types that may access configuration data 220, such as a primary host (column 305), a failover host (column 340), a backup or reporting host (column 315) and a replicated host (column 320). Rows 325, 330, 335, 340, 345 and 350 may include the actual values for each option for each respective host. Thus, column 325 may include the different values for a mount point for each of the four types of hosts. For example, a primary host (column 305) may use a mount point (row 325) of /appdata while a backup host (column 315) may use a mount point of /servername/appdata. Thus, different hosts may use different option values from contest dependent configuration data 220. Additionally, each of columns 305, 310, 315, and 320 may be considered different versions of the configuration data. For example, the values from column 305 may be included in file system configuration data 120A, column 310 may represent file system configuration data 120B, column 315 may represent file system configuration data 120C, and column 320 may represent file system configuration data 120D, such as described above regarding FIG. 2.

As noted above, FIG. 3A illustrates five exemplary configuration options that may be included in file system configuration data, according to one embodiment. As described above, a mount point may represent the root level of a file system that the host may use when accessing data for the file system, in one embodiment. File system configuration data may also include other mount options, such as illustrated in column 315 of FIG. 3A. Read-ahead options, such as whether to use sequential or non-sequential read-ahead operations may be included that define how a host should perform read-ahead operations on the data of the file system, in one embodiment. In other embodiments, the file system itself may perform the read-ahead operation when the host is accessing the file system and may customize, or perform read-ahead operations differently, when different hosts are reading data, according to the values for a read-ahead option stored in file system configuration data, such as illustrated by column 335 of FIG. 3A.

File system software, or another system interacting with file system data, may be configured to perform various data related operations on the file system data and file system configuration data 120 may include various options and option values for such data related operations. For example, in some embodiments, a file system may be implemented across multiple storage devices or storage subsystems, each of which may have different performance and quality characteristics. In such embodiments, the file system software, a volume manager, or other data management application, may be configured to move data between various storage device depending upon the storage requirements of the particular data and storage (such as performance and quality) characteristics of the individual storage devices. For example, in one embodiment, data that is not accessed frequently may be moved to a storage device with slower performance characteristics. Thus, a file system, volume manager or other data management application, may be configured to periodically scan the data in the file system to determine whether any of it should be relocated. In some embodiments, such periodic analysis may be considered a quality of storage service scan (QoSS scan) and option values related to such QoSS scans may be stored in file system configuration data and may vary from host to host, as illustrated by row 340 of FIG. 3A. In other embodiments, a file system, volume manager, or other data management application, may be configured to monitor, such as via one or more system daemons, the data in a file system to determine whether any of it should be relocated.

Additionally, in some embodiments, file system configuration data may include options related to backing up or replicating file system data, such as a frequency at which to perform a checkpoint, snapshot, or other point-in-time copy, of file system data, as illustrated by row 345 of FIG. 3A. In other embodiments, file system configuration data may include options related to the logging of file system data, such as whether a host should update a file change log, as illustrated by row 350 of FIG. 3A. Additionally, the configuration data may include options for controlling the contents of a file change log, such as for controlling the contents of a file change log used for security or compliance information. In still other embodiments, file system configuration data may include options or configuration information for controlling applications such as anti-virus or behavior blocking security programs.

FIG. 3A illustrates one possible way of formatting file system or volume configuration data, according to one embodiment. In other embodiments, configuration data may be formatting in a different manner. For example, in FIG. 3A, column 300 represents configuration data settings, while the other columns represent the particular values for those settings for each type of host. Thus, columns 305, 310, 315 and 320 may represent different roles and the value of each configuration setting of column 300 for that role. In other embodiments, however, each row of the configuration data may include one column identifying a role, one column representing the various configuration settings, and a third column representing the value of each setting for the particular role.

Please note that FIG. 3A illustrates only one exemplary set of configuration options and that other embodiments may include different and a different number of configuration options and values. For example some embodiments may include migration policy options specifying how or when data may be migrated from one storage device to another or from one distributed system to another. Additionally, while FIG. 3A illustrates 4 different categories of hosts having different versions of the configuration data, in some embodiments, fewer, additional and/or different types of hosts, or other devices, systems or applications, may be included in file system configuration data.

FIG. 3B illustrates an alternative manner of formatting file system configuration data according to one embodiment. While FIG. 3A, discussed above included one column representing configuration options, or possible settings, and additional columns each representing a different type of host and including the value for each configuration option or setting for that particular host. As illustrated in FIG. 3, the various values for configuration settings or options are specified according to the different roles that a host may take on. For example, column 350 represents the different roles, column 355 illustrates the various settings, and column 360 specifies the particular value for the corresponding setting of column 355 and according to the corresponding role of column 350. The various configuration options are repeated in later rows for the different roles. Thus, row 365 represents the first setting/value pair for a primary host role and rows 370, 375 and 380 represent the first setting/value pair for each of the roles of fail over hose, backup host and replicated host, respectively. Thus, each row of FIG. 3B specifies a value for a single configuration setting for a single, specific configuration setting for a single role. As with FIG. 3A, described above, FIG. 3B illustrates only one exemplary set of roles, settings and values, according to one embodiment. Other embodiments may include different, additional, or fewer roles, settings and values than those illustrated in FIG. 3B.

Figure 4:
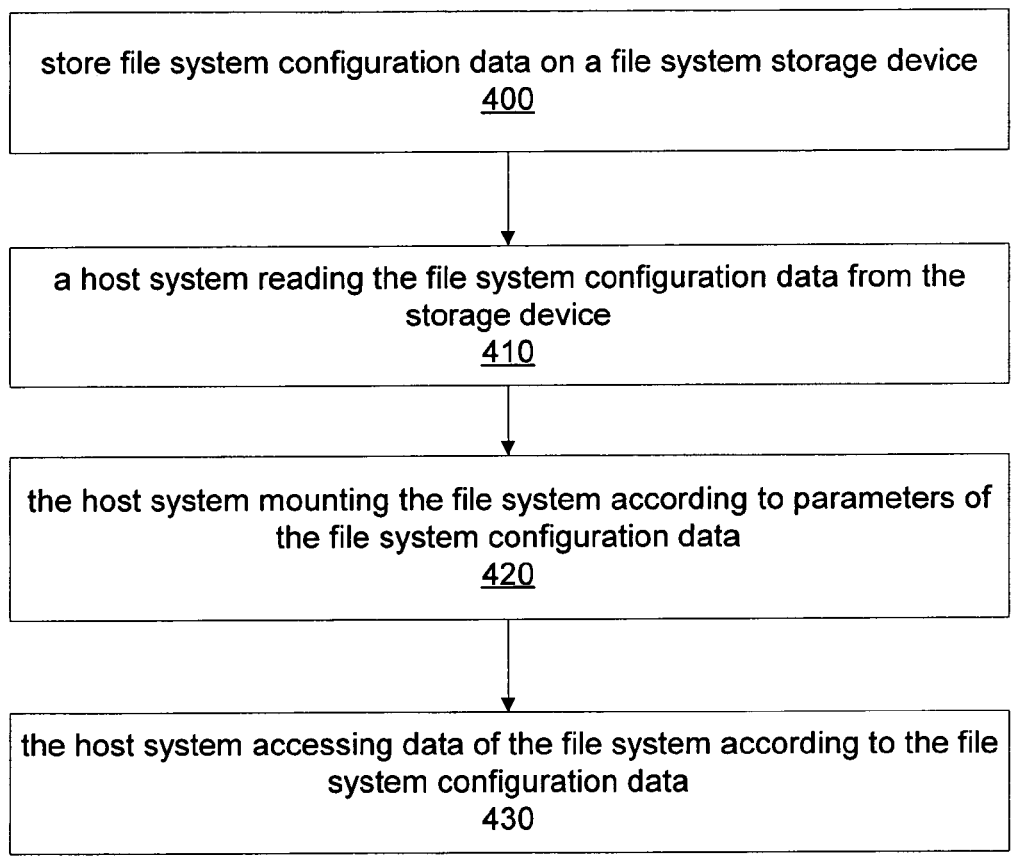
FIG. 4 is a flowchart illustrating one embodiment of a method for using configuration data stored on a storage device external to a host system accessing the data on the storage device.

FIG. 4 is a flowchart illustrating one embodiment of a method for using configuration data stored on a storage device external to a host system accessing the data on the storage device. For example, as described above, file system configuration data, such as file system configuration data 120 may be stored on a remote (from a host point of view) storage device, such as storage device 150, as illustrated by block 400. As noted above, configuration data may be stored either as part of a file system or in a separate storage area, such as a private configuration volume, on a storage device. A host system, such as host 110 may desire to access the data on the storage device may be configured to read the file system configuration data from the storage device, as illustrated by block 410. As noted above, a host may access the configuration data from a remote storage device in various ways. For example, in one embodiment, the storage device, or another system such as a volume manager, may provide a special set of functions or messages configured to allow access to the configuration data stored on the storage device. Thus, in one embodiment, host 110 may send a special request message to storage device 150 requesting the configuration data and storage device 150 may return the relevant configuration data to host 110 in response.

After obtaining the file system configuration data 120 from storage device 150, host 110 may be configured to mount the file system on storage device 150 according to the parameters or values from the file system configuration data 120, as illustrated by block 420. After mounting the file system according to the file system configuration data 120, host 110 may also be configured to access the data of the file system, also according to the file system configuration data 120, according to some embodiments and as illustrated by block 430. In some embodiments, the host system may access the file system data to perform, either periodically, continually, or continuously, any of various tasks or administrative operations on the file system, such as Quality of Service Scans or updating a file change log. Thus, file system configuration data 120 may store not only information for mounting a file system, but may also include information for properly accessing and using the file system. Additionally, as noted above, the file system configuration data 120 may also include information regarding various operations that host 110 may perform on, or using, the data from the file system, such as backup, checkpoint, snapshot, replications, or other data operations, according to certain embodiments.

Figure 5:
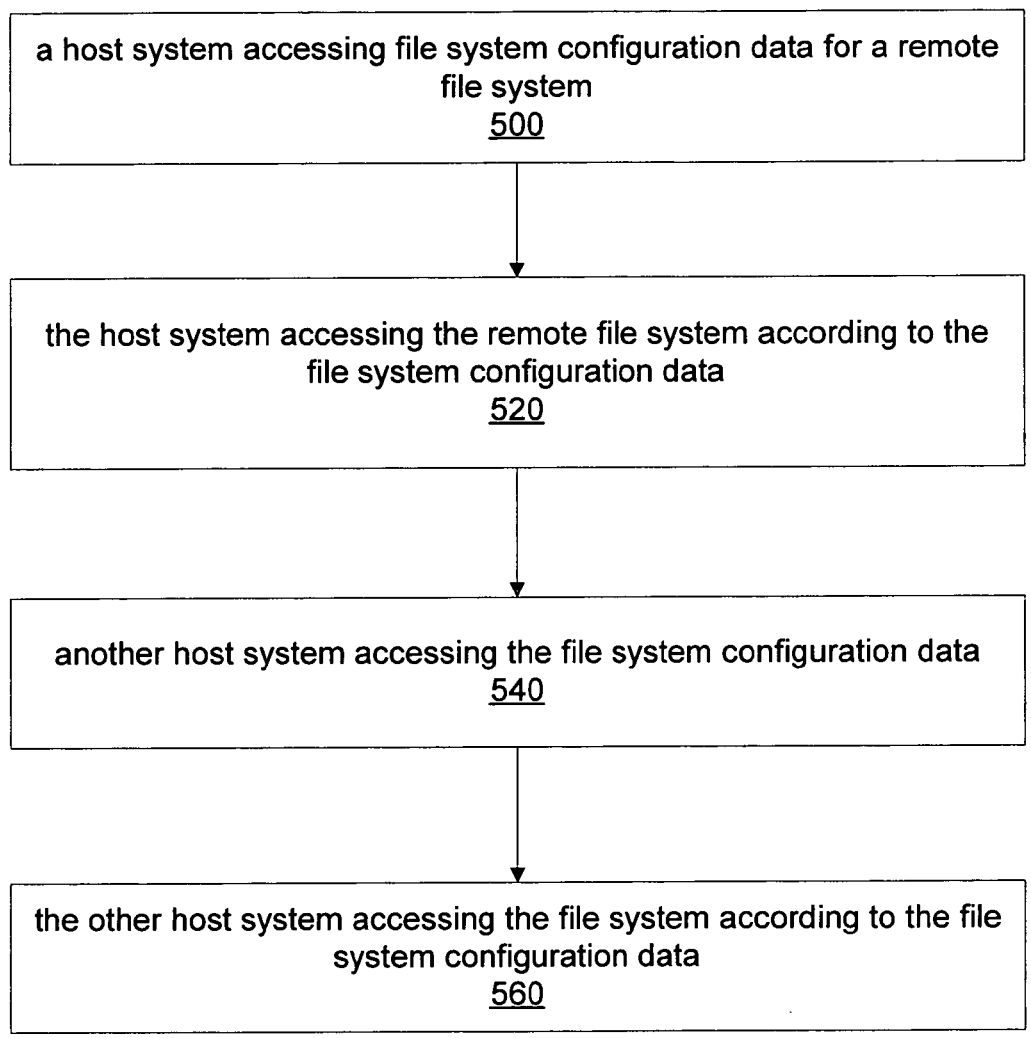
FIG. 5 is flowchart illustrating one embodiment of a method for two hosts to access a file system according to file system configuration data stored with the file system data.

FIG. 5 is flowchart illustrating one embodiment of a method for two hosts to access a file system according to file system configuration data stored with the file system data. For example, as illustrated in block 500, a host system may access file system configuration data for a remote file system, as described above. For example, a host may access file system configuration data from a storage device that is separate from the host system. In one embodiment, the host may be configured to read the file system configuration data using initial configuration information stored on, or associated with, the host. Additionally, a host may access the file system configuration information by reading the configuration data directly, while in some embodiments, a host may be configured to request the configuration data using an API or a message interface with the storage device on which the configuration data is stored. For instance, in one embodiment host 110 may send a request message to storage device 150 requesting the file system configuration data 120 and storage device 150 may, in response, send the file system configuration information to host 110. Alternatively, in another embodiment, host 110 may send the request message to another device that is part of a distributed storage system, such as a SAN or other network storage system, which may be configured to load the file system configuration data from storage device 150 and return the configuration data to host 110. Thus, in some embodiments, hosts or other nodes that have access to configuration data may supply that information to hosts or nodes that cannot directly access the configuration data.

After accessing the file system configuration the host may access the remote file system according to the system configuration data, as indicated by block 520. For example, file system configuration data 120 may include values for various options, such as a mount point location, and host 110, after accessing file system configuration data 120, may access the file system using the mount point location specified in file system configuration data 120.

Additionally, another host system may also access the file system configuration data, as illustrated in block 540 and may then access the file system according to the file system configuration data, as illustrated by block 560. As described above regarding FIG. 4, a host may access the file system according to the file system configuration data to periodically, continually, or continuously perform any of various tasks or administrative operations on the file system. In some embodiments, only a single host may be configured to access a file system at a time. In such an embodiment, a first host, such as host 110, that is currently accessing a file system may have to stop accessing and unmount the file system before another host may be able to access the file system. For example, in one embodiment, a file system may be moved from one host to another and the first host may unmount the file system, thereby allowing a second host to access the file system configuration data and access, such as by mounting, the file system according to the file system configuration data. In other embodiments, however, multiple hosts may be able to access both the file system configuration data and the file system itself at the same time. For example, a backup or replicating host may be configured to access file system configuration data and the corresponding file system at the same time as a primary host is also accessing the file system, according to some embodiments.

In some embodiments, one host may access file system configuration data and the file system data and another host may access the file system configuration data and the file system data via a snapshot, array snapshot, or other point-in-time copy, of the file system data and the configuration data. In one embodiment, by accessing a copy, such as a snapshot, of file system data and file system configuration data, more than one host may be able to access the file system data concurrently. In some embodiments, an array level snapshot may be made and a host may access the file system configuration data from the array-level snapshot. In other embodiments, a host may access file system configuration data from a host-level snapshot of a file system, including the file system data as well as the file system configuration data. In some embodiments, a second host may access file system configuration data from a snapshot of a file system even when that snapshot resides on another host. For example, a first host may access file system configuration data from its original storage location and another host may access the file system configuration data from a copy or snapshot stored on the first host. A second host accessing a snapshot of file system data and configuration data may prevent the need to have the file system configuration data manually entered and/or configured on the second host, according to some embodiments.

When multiple hosts may be accessing the file system concurrently, the file system configuration data may specify which of the hosts should perform a particular task or administrative operations, according to some embodiments. For example, as illustrated in FIGS. 3A and 3B, discussed above, the file system configuration data may specify that the primary host perform the daily Quality of Service Scans (QoSS), according to one embodiment. In some embodiments, configuration data may specify a host by name to perform or initiate a certain task. For instance, file system configuration data 120 may specify that a periodic tier scan should be performed by a first host, say host A and if host A is not available then host B should perform the periodic tier scan. In other embodiments, however, the file system configuration data may include various values and options but may not specify which particular host should perform particular task or administrative operations. For instance, the configuration data may specify a particular quality or capability (either required or preferred) to identify which host should perform (or initiate) a task or administrative operation. For example, in one embodiment, file system configuration data 120 may specify that whichever host has the most I/O bandwidth should perform a periodic storage tier scan or that whichever host has the most CPU throughput should perform a defragmentation task. In one embodiment, initial configuration on a host device may specify what tasks that particular host should perform. In another embodiment however, multiple host may agree, such as based on various policies or via live, inter-host communication, which host should perform which tasks or administrative operations.

Figure 6:
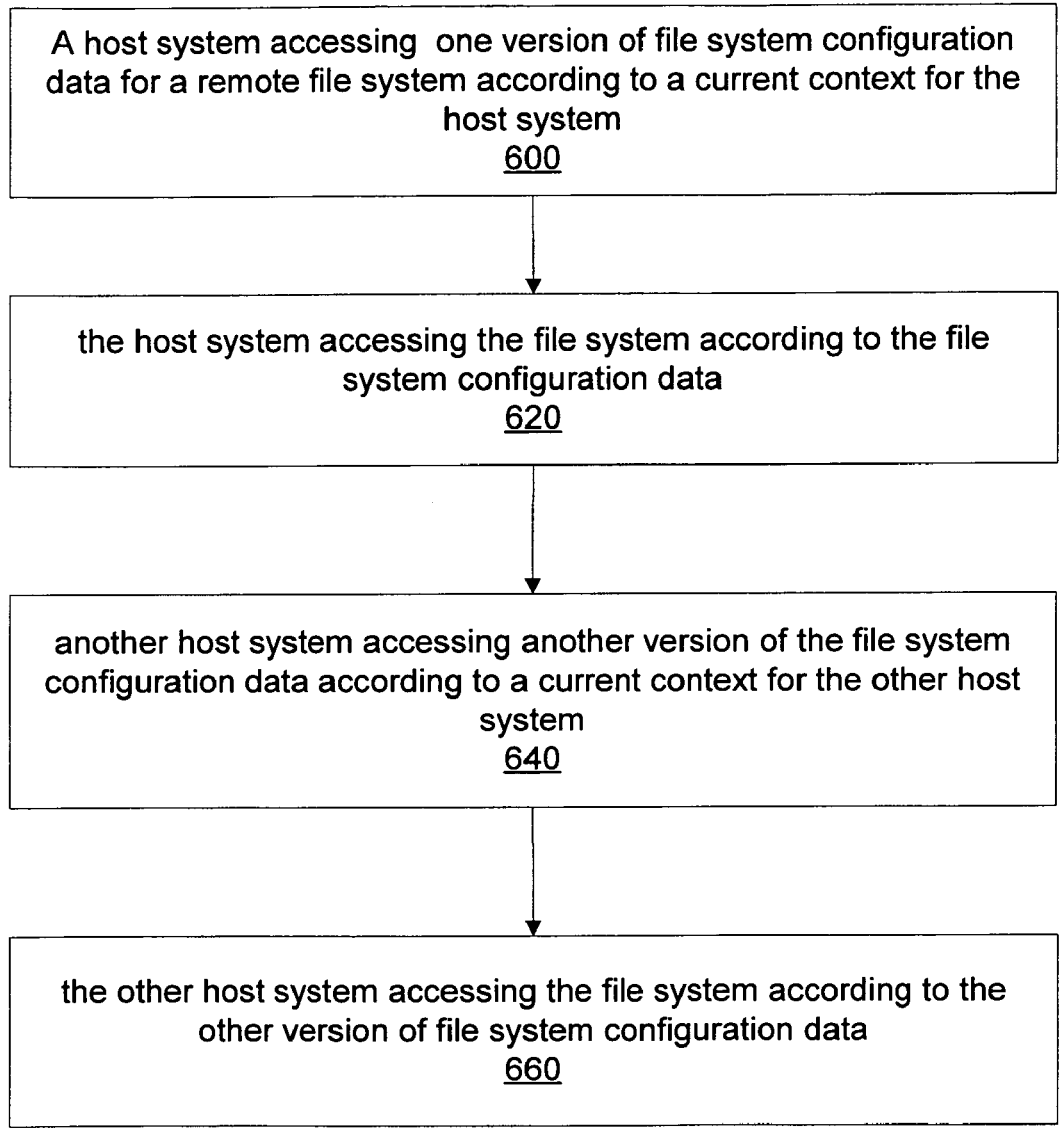
FIG. 6 is a flowchart illustrating one embodiment of a method for using context dependent configuration data stored on a storage device to access data on the storage device from multiple host systems.

While the discussions above mainly refer to using a single version of file system configuration data, in some embodiments, different hosts may access and use different versions of file system configuration data, as discussed above. For example, a primary host may use one set of configuration options or values, while a failover, backup, or replication host may use a different set of configuration options or values, such as described above regarding FIGS. 2 and 3. FIG. 6 is a flowchart illustrating one embodiment of a method for using context dependent configuration data stored on a storage device to access data on the storage device from multiple host systems. For example, as illustrated by block 600, a host system, such as host 110A may access one version of file system configuration data, such as file system configuration data 120A, according to a current context for the host system. Various types of information may be used as contexts for a host system when accessing file system configuration data.

As noted above regarding FIGS. 2 and 3, a storage device, such as storage device 150 may be configured to store multiple versions of configuration information and different host system may access and use different versions of the configuration information, in some embodiments. For example, in some embodiments, an identification of a role for a host may be used as a current context when that host obtains file system configuration data from a remote storage device. In some embodiments, the context information for a host may be stored on the host, such as in initial configuration data 140, described above. In other embodiments, a host may store or obtain context information in various ways or from various sources. In yet other embodiments, the storage device, or a manager application managing the storage device, may be configured to associate a host system with a current context when that host obtains file system configuration data. Alternatively, an administrator may utilize a management interface, as described above, to assign or associate context information with host systems, either on each host system in some embodiments, or via a single database on the remote storage device in other embodiments. In general, any suitable method of associating a host system with context information may be utilized to implement context dependent configuration data as described herein.

After accessing one version of the file system configuration data, the host system may be configured to access the file system according to the respective version of the file system configuration data, as described previously. As noted above, in some embodiments, more than one host system may be configured to access the file system concurrently. Thus, another host system, separate from the first host system, may access another version of the file system configuration data according to a current context for the other host system, as indicated by block 640. For example, after host 110A accesses file system configuration data 120A according to host context ID 210A, as described above, host 110B may access file system configuration data 120B according to host context ID 210B, in one embodiment. In some embodiments, a host's context may be determined by information stored one the host itself and that the host provides to storage device 150 when accessing file system configuration data. For example, a file stored on the host may include an indication of the host's context, such as an indication of a particular role for the host in a distributed or clustered environment. For instance, in one embodiment, host 110A may have a file that indicates that host 110A is a primary host and host 110B may have a file that indicates that host 110B is a failover host. In other embodiments, a host's context may be associated with the host in other ways, such as in the file system configuration data itself. After reading the other version of the file system configuration data the other host system may then access the file system according to the other version of the file system configuration data, as illustrated by block 660. For instance, host system 110B may access a different version of the configuration data, such as file system configuration data 120B from the storage device 150, as illustrated by block 520.

As described above, each of hosts 110A and 110B may include a host context ID, such as host context IDs 210A and 210B, respectively, when accessing the configuration data from the storage device. Thus, in some embodiments, host 110A may receive and use one version of configuration data, such as file system configuration data 120A, while host 110B may receive and use a different version of configuration data, such as file system configuration data 120B, from the same storage device, according to the different host context IDs. Additionally, host 110B may mount and access the file system according to the different version of the configuration data, as illustrated by block 530. In other words, host 110A may use file system configuration data 120A to access data from storage device 150 while host 110B may use file system configuration data 120B to access data from storage device 150. For instance, hosts 110A and 110B may use different mount point locations, as indicated by the information in each respective version of configuration data. Also, as noted above, each host may perform different data-related operations, such as performing backups, checkpoints, snapshots, quality of storage service scans, etc, based on the version of configuration data that each respective host uses. For instance, host 110A may perform daily quality of storage service scans while host 110B may not perform any quality of storage service scans, according to one embodiment.

While the discussion above refers to multiple hosts accessing both the file system configuration data the file system data itself, in some embodiments only one host system may be configured to access the file system at a time, such as to avoid data collision or corruption issues. Thus, in some embodiments, a first host may have to unmount the file system before another host can access it.

While the above discussion refers to hosts accessing file system configuration data according to a current contest for the respective host, in some embodiments, a host may use a current context to access other context dependent configuration information, such as for a volume, a clustered environment, etc. Thus, in some embodiments, a storage device may store context dependent configuration data for other things than for a file system and may store multiple versions of such configuration data in order to allow different hosts, or other systems, to access different versions of the configuration data according to a current context for the respective host.

Please note that while the methods illustrated by FIGS. 4, 5 and 6 has been described above using certain operations and actions, other embodiments of these methods may include fewer, additional and/or different operations or action than described above.

Figure 7:
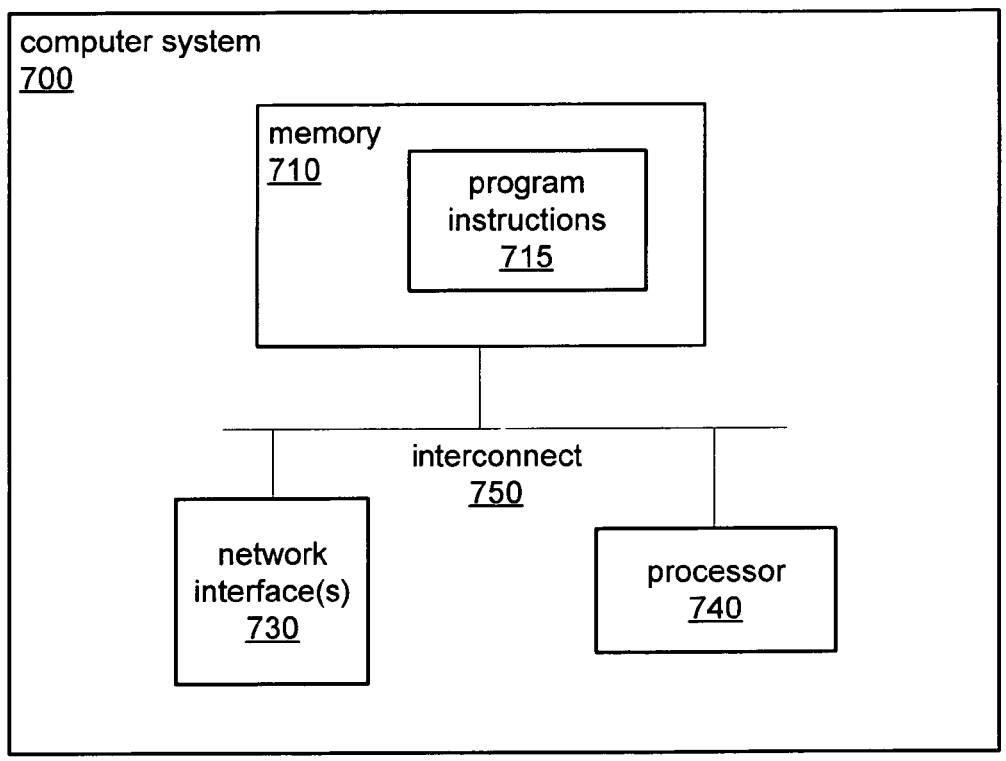
FIG. 7 is a block diagram illustrating a computer system capable of implementing remotely stored file system configuration data, according to one embodiment.

FIG. 7 illustrates a computing system capable of implementing remotely stored file system configuration data as described herein, according to various embodiments. Computer system 700 may be any of various types of devices, including, but not limited to, a personal computer system, desktop computer, laptop or notebook computer, mainframe computer system, handheld computer, workstation, network computer, a consumer device such as a mobile phone, pager, or any type of networkable peripheral device such as storage devices, switches, modems, routers, etc, or in general any type of networkable computing device. Computer system 700 may include at least one processor 740. Processor 740 may couple across interconnect 750 to memory 710 and I/O interfaces 730. I/O interfaces 730 may be any of various types of interfaces configured to couple with and communicate with other devices, according to various embodiments. In one embodiment I/O interfaces 730 may represent a network interface configured to couple with and communicate over network 100 illustrated in FIG. 1, described above.

Memory 710 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 710 may include program instructions 715 configured to access file system configuration information stored on a remote device, as described herein. In certain embodiments, program instructions 715 may be configured to implement a host, such as host 110, described above. In other embodiments, program instructions 715 may be configured to implement a storage device, such as storage device 150, also described above.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
a host system accessing data stored within a file system of a remote storage device, wherein:
the remote storage device is configured to store and maintain file system configuration data on the remote storage device;
the file system configuration data stored on the remote storage device includes information for said accessing, from the host system, the data stored within the file system of the remote storage device; and
said accessing the data comprises the host system's performing:
reading the file system configuration data from a location within the remote storage device; and
mounting the remote device's file system to the host system, wherein said mounting is performed by the host system:
according to the file system configuration data read from the remote storage device;
without requiring the file system configuration data locally on the host system prior to reading the file system configuration data from the remote storage device; and
without manually entering file system configuration data on the host system.

2. The method of claim 1, wherein the host system and the remote storage device are part of a clustered storage environment.

3. The method of claim 1, further comprising:
the host system reading initial configuration information stored on the host system, wherein the initial configuration information comprises information for accessing the file system configuration data; and
wherein said reading the file system configuration data comprises the host system accessing the file system configuration data according to the initial configuration information.

4. The method of claim 1, wherein said reading the file system configuration data further comprises the host system accessing one of a plurality of versions of the file system configuration data according to a current context associated with the host system.

5. The method of claim 1, further comprising:
another host system reading the file system configuration data stored on the remote storage device; and
the other host system accessing the file system of the remote storage device according to the information in the file system configuration data.

6. The method of claim 1, further comprising storing the file system configuration data in a hidden file within the file system of the remote storage device.

7. The method of claim 1, further comprising storing the file system configuration data in a private storage volume on the remote storage device.

8. The method of claim 1, wherein the remote storage device is part of a distributed storage environment.

9. The method of claim 1, wherein the file system configuration data includes at least one of migration policy options, mount point identification, mount options, defragmentation options, backup options, replication options, read-ahead options, quality of storage service options, file change log options, anti-virus application options, behavior blocking security application options, and periodic checkpointing options.

10. A system, comprising:
a host system, comprising:
a processor; and
a memory coupled to the processor, wherein the memory comprises program instructions executable by the processor to cause the host system to perform accessing data stored within a file system of a remote storage device, wherein:
the remote storage device is configured to store and maintain file system configuration data on the remote storage device;

the file system configuration data stored on the remote storage device includes information for said accessing, from the host system, the data stored within the file system of the remote storage device; and said accessing the data comprises the host system's performing:
reading the file system configuration data from a location within the remote storage device; and
mounting the remote device's file system to the host system, wherein said mounting is performed by the host system:
according to the file system configuration data read from the remote storage device;
without requiring the file system configuration data locally on the host system prior to reading the file system configuration data from the remote storage device; and
without manually entering file system configuration data on the host system.

11. The system of claim 10, wherein the host system and the remote storage device are part of a clustered storage environment.

12. The system of claim 10, wherein the program instructions are further executable by the processor to cause the host system to perform reading initial configuration information stored on the host system, wherein the initial configuration information includes information for accessing the file system configuration data; and
wherein, in order for the host system to perform said reading the file system configuration data, the program instructions are further executable by the processor to cause the host system to access the file system configuration data according to the initial configuration information.

13. The system of claim 10, wherein, in order for the host system to perform said reading the file system configuration data, the program instructions are further executable by the processor to cause the host system to access one of a plurality of versions of the file system configuration data according to a current context associated with the host system.

14. The system of claim 10, further comprising:
another host system, wherein the other host system is configured to:
read the file system configuration data stored on the remote storage device; and
access the file system of the remote storage device according to the information in the file system configuration data.

15. The system of claim 10, wherein the remote storage device is configured to store the file system configuration data in a hidden file within the file system of the remote storage device.

16. The system of claim 10, wherein the remote storage device is configured to store the file system configuration data in a private storage volume on the remote storage device.

17. The system of claim 10, wherein the remote storage device is part of a distributed storage environment.

18. The system of claim 17, wherein the distributed storage environment comprises at least one of: a Storage Area Network (SAN) device, a (Network Attached Storage (NAS) device, and a Object-based Storage Device (OSD).

19. The system of claim 10, wherein the file system configuration data includes at least one of: migration policy options, mount point identification, mount options, defragmentation options, backup options, replication options, read-ahead options, quality of storage service options, file change log options, anti-virus application options, behavior blocking security application options, and periodic checkpointing options.

20. A system, comprising:
a storage device configured to store a plurality of different versions of file system configuration data; and
a plurality of host devices, where each of the host devices is:
associated with a current context that is particular to the host device;
communicably coupled to the storage device; and
configured to access at least one of the plurality of different versions of file system configuration data that corresponds to the current context associated with and particular to the respective host device.

* * * * *